(12) United States Patent
Lin et al.

(10) Patent No.: US 8,858,052 B2
(45) Date of Patent: Oct. 14, 2014

(54) BACKLIGHT MODULE

(75) Inventors: Yu-Jeng Lin, Taoyuan (TW); Wen-Yen Cho, Taoyuan (TW)

(73) Assignee: Global Lighting Technology Inc., Taoyuan (TW)

( * ) Notice: Subject to any disclaimer, the term of this patent is extended or adjusted under 35 U.S.C. 154(b) by 616 days.

(21) Appl. No.: 13/076,439

(22) Filed: Mar. 31, 2011

(65) Prior Publication Data

US 2011/0242841 A1 Oct. 6, 2011

(30) Foreign Application Priority Data

Mar. 31, 2010 (TW) .............................. 99109953 A
Jun. 1, 2010 (TW) .............................. 99117651 A

(51) Int. Cl.
| | | |
|---|---|---|
| *G02B 6/13* | (2006.01) | |
| *F21V 8/00* | (2006.01) | |
| *G02F 1/1333* | (2006.01) | |
| *G02F 1/1335* | (2006.01) | |

(52) U.S. Cl.
CPC ........ *G02B 6/0083* (2013.01); *G02F 1/133615* (2013.01); *G02B 6/0055* (2013.01); *G02F 1/13338* (2013.01)
USPC ......................................... 362/612; 362/630

(58) Field of Classification Search
USPC ......... 362/606, 605, 612, 615, 629, 630, 246, 362/646, 631
See application file for complete search history.

(56) References Cited

U.S. PATENT DOCUMENTS

| | | | | |
|---|---|---|---|---|
| 7,488,104 | B2 * | 2/2009 | Hamada et al. | 362/616 |
| 2004/0169187 | A1 * | 9/2004 | Fujii | 257/98 |
| 2007/0064439 | A1 * | 3/2007 | Song | 362/555 |
| 2007/0153548 | A1 * | 7/2007 | Hamada et al. | 362/615 |
| 2007/0154199 | A1 * | 7/2007 | Chu | 396/106 |
| 2007/0261779 | A1 * | 11/2007 | Song et al. | 156/99 |
| 2009/0086508 | A1 * | 4/2009 | Bierhuizen | 362/617 |
| 2011/0089005 | A1 * | 4/2011 | Yang | 200/314 |
| 2011/0280046 | A1 * | 11/2011 | Tsai et al. | 362/613 |
| 2013/0051067 | A1 * | 2/2013 | Chen | 362/607 |
| 2013/0087440 | A1 * | 4/2013 | Huang et al. | 200/314 |
| 2013/0250617 | A1 * | 9/2013 | Ahn et al. | 362/613 |

FOREIGN PATENT DOCUMENTS

CN 1532674 A 9/2004

* cited by examiner

*Primary Examiner* — Jong-Suk (James) Lee
*Assistant Examiner* — Leah S Macchiarolo
(74) *Attorney, Agent, or Firm* — CKC & Partners Co., Ltd.

(57) ABSTRACT

The present invention relates to a backlight module and a manufacturing method thereof. The backlight module comprises a thin film unit, a light guide unit, an insulation layer and at least a light source. The thin film unit is installed with a first circuit. The light guide unit is installed with a second circuit. The insulation layer is installed between the thin film unit and the light guide unit. The light source is electrically connected to the first circuit, and the light thereof projects into the light guide unit.

20 Claims, 10 Drawing Sheets

BACKLIGHT MODULE

RELATED APPLICATIONS

This application claims priorities to Taiwanese Application Serial Number 099109953, filed Mar. 31, 2010, and Taiwanese Application Serial Number 099117651, filed Jun. 1, 2010, which are herein incorporated by reference.

BACKGROUND

1. Technical Field

The present invention relates to an improved structure of an illumination device serving as a backlight source which has a simplified structure.

2. Description of Related Art

Backlight modules are widely adopted in electronic devices such as notebook computers, monitors, cell phones, or liquid crystal televisions. The display component installed in the electric device not able to emit light by itself is required a backlight module for serving as a light source.

A conventional backlight module consists of a light guide unit and a light source, for an electronic product having a thin case, LED is often adopted as the light source, and the light source often referred as a side view light source is installed at a lateral side (a light incident surface) of the light guide unit. A first surface of the light guide unit is installed with a reflection sheet, a second surface opposite to the first surface is served as a light output surface, and can be installed with a plurality of optical membranes composed of diffusion sheets or prism lens according to actual needs, then a frame is provided for enclosing the mentioned components. The light emitted by the light source projects into the lateral side of the light guide unit, a part thereof is reflected by the reflection sheet then in sequence passes through the diffusion sheets and the prism lens set on the light output surface so as to be outputted outwards the light guide unit.

As shown in FIG. 1, which is a conventional illumination device serving as a backlight module adopted in a touch-control type electronic product, and the structure thereof includes an upper thin film layer A, a lower thin film layer B, an insulation layer C, a light guide unit D and at least a light source E; corresponding surfaces of the upper thin film layer A and the lower thin film layer B are respectively installed with a first circuit A1 and a second circuit B1; the insulation layer C is installed between the upper thin film layer A and the lower thin film layer for partitioning the first circuit A1 and the second circuit B1; the insulation layer C is formed with through holes C1 corresponding to plural electric conduction joints formed on the first and second circuits A1 and B1, accordingly when pressing the upper thin film layer A at the locations corresponding to the electric conduction joints, upper electric conduction joints A2 of the upper thin film layer can penetrate the through holes and be in electrical contact with lower electric conduction joints B2 of the lower thin film layer. The light guide unit D is installed below the lower thin film layer B, the light source E is installed at a lateral side of the light guide unit D, so the light of the light source E being input and transferred in the light guide unit can penetrate the lower thin film layer B, the insulation layer C and the upper thin film layer A. The mentioned illumination device can be adopted to serve as a backlight source in an electronic product such as a keyboard of notebook computer, a cell phone, various types of dashboards, a clock, a watch or a digital photo frame.

SUMMARY

The present invention provides a backlight module.

One feature of the backlight module according to the present invention is to remove the lower thin film layer of backlight module of the mentioned illumination device, and the circuit installed on the mentioned lower thin film layer is now directly installed on the light guide unit, then the light guide unit is combined with the insulation layer of the thin film unit, so the assembly process of illumination device, the structure and the volume are simplified and reduced.

One feature of the backlight module according to the present invention is to remove the lower thin film lower of backlight module of the mentioned illumination device, and the circuit installed on the mentioned lower thin film layer is now directly installed on the light guide unit, then the light guide unit is combined with the insulation layer of the thin film unit, so the assembly process of illumination device, the structure and the volume are simplified and reduced.

Another feature of the backlight module according to the present invention is to install the light source in the backlight module so as to prevent the side edges of a light guide unit from being exposed outwardly, and the light source is installed to face a lateral side (served as a light incident surface) of the light guide unit so as to project light into the lateral side of the light guide unit, so the volume of illumination device is further reduced.

One solution according to the backlight module of the present invention is to install a first circuit on a first surface of a thin film unit, and a second circuit is installed on a second surface (as the light output surface) of a light guide unit, the first surface of the thin film unit and the second surface of the light guide unit installed with the mentioned circuits are symmetrically arranged, and an insulation layer is installed between the two circuits, the insulation layer is formed with through holes corresponding to the locations where electric conduction joints of the first circuit and electric conduction joints of the second circuit are installed, so when the thin film unit is pressed at the locations corresponding to the mentioned electric conduction joints, the electric conduction joints of the first circuit can go through the through holes to be in electrical contact with the electric conduction joints of the second circuit.

Also, in the backlight module of the present invention, at least a light source is electrically connected to the first circuit to project lights into the light guide unit.

In another of the embodiment, the insulation layer and the light guide unit are respectively formed with a first hole and a second hole corresponding to each other, and the light source is disposed in the first hole and the second hole. In one option of the embodiment, the second hole can be a through hole or a blind hole.

In the other one of the embodiment, a length of the insulation layer is shorter than a length of the thin film unit, the light source is disposed in a space formed through the length difference of the insulation layer and the thin film unit.

In the other one of the embodiment, a length of the light guide unit is shorter than a length of the thin film unit, the light source is disposed in a space formed through the length difference of the light guide unit and the thin film unit.

In still the other one of the embodiment, a length of the insulation layer and a length of the light guide unit are both shorter than a length of the thin film unit, the light source is disposed in a space formed through the length difference of the insulation layer and the thin film unit, and through the length difference of the light guide unit and the thin film unit.

Other options of the embodiment, the thin film unit can be a flexible thin film unit; the light guide unit is a flexible light guide unit.

Moreover, the present invention discloses a backlight module for increasing the light reflection rate, lowering the possibilities of light being absorbed by the silver paste circuit, so the utilization rate of light source is increased.

The present invention also discloses a backlight module for reducing the chances of generating chromatic while light being output through the light guide unit, so the quality of output light of the backlight module is increased.

According to the backlight module, the backlight module includes a light guide unit, a light source, a reflection layer and a second circuit. The second circuit can be a silver paste circuit layer. The light source is installed at the light incident surface of the light guide unit. The reflection layer is formed with a first pattern and installed on the light output surface of the light guide unit. The second circuit has a second pattern and installed on the first pattern.

In one of the embodiments, a range of the second pattern of the second circuit is smaller, larger or equal to a range of the first pattern of the reflection layer.

In options of the embodiment, the reflection layer includes resin material, or the reflection layer can be in white or silver color; or the light guide unit is a flexible printed circuit board.

In one of the embodiments, the reflection layer can be transparent, and the refraction rate of the reflection layer is smaller than the refraction rate of the light guide unit.

In other embodiments, the flexible printed circuit board has a plurality of optical microstructures arranged on the light incident surface or another surface of the flexible printed circuit board opposite to the light output surface.

As an alternative of the present invention, the manufacturing method of the backlight module comprises the steps of providing a light guide unit, wherein the light guide unit has a light output surface; then forming a reflection later on the light output surface of the light guide unit with respect to a first pattern; then, forming a second circuit on the first pattern with respect to a second pattern.

As such, with the reflection layer installed between the second circuit and the light guide unit, when the light in the light guide unit is transferred towards an area where the light output surface being provided the second circuit, the light can be reflected by the reflection layer back to the light guide unit then be output from an area of the light output surface not being provided the reflection layer or the second circuit, so the possibilities of outputting light is increased and brightness and utilization rate of light source are raised.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides a backlight module and a manufacturing method thereof.

Figure 1:
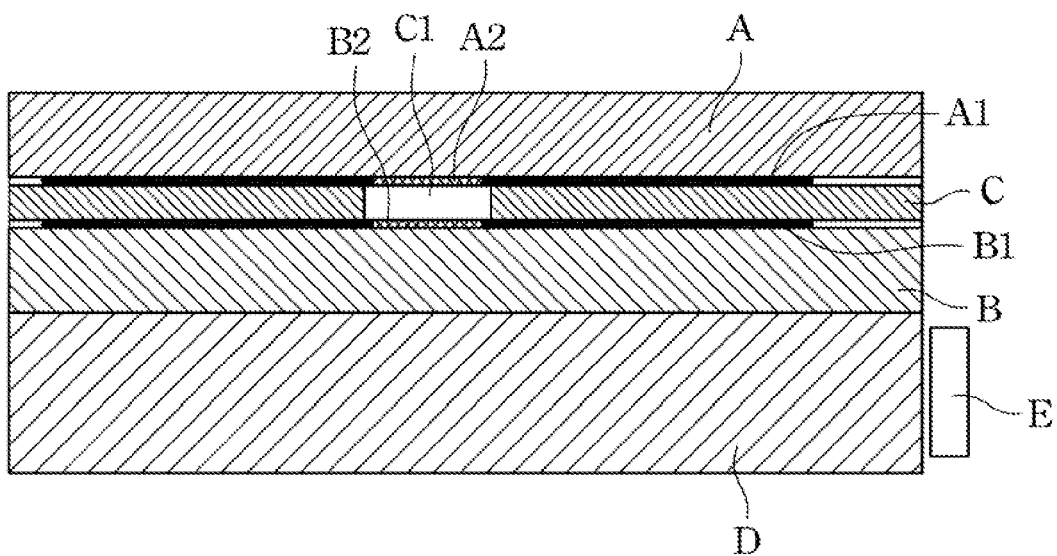
FIG. 1 is a schematic plane view showing a conventional illumination device.
Figure 2:
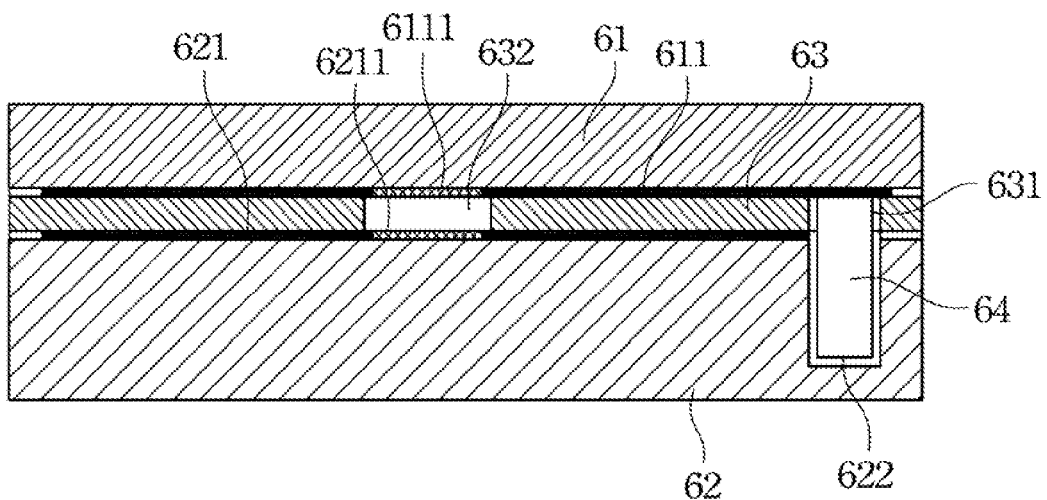
FIG. 2 is a schematic plane view showing the illumination device according to the first embodiment of the present invention.

As shown in FIG. 2, which shows the backlight module of illumination device according to one embodiment of the present invention.

The backlight module comprises a thin film unit 61, a light guide unit 62, an insulation layer 63 and at least a light source 64. The thin film unit 61 can be made of polyethylene terephthalate (PET) so as to obtain a flexible thin film. A first surface of the thin film unit 61 is arranged with a first circuit 611 overlaid thereon, and the first circuit 611 includes at least a first electric conduction joint 6111. The light guide unit 62 is made of a material having good light guiding performance and laminated as a thin and flexible sheet. A second circuit 621 is directly overlaid on a second surface (as a light output surface) of the light guide unit 62, and the second circuit 621 includes at least a second electric conduction joint 6211. The insulation layer 63 is served as an electrical insulator for insulating electrical connection to install between the thin film unit 61 and the light guide unit 62, such that the first circuit 611 of the thin film unit 61 is arranged at a symmetrical location relative to the second circuit 621 of the light guide unit 62, and the first electric conduction joint 6111 is corresponding to the second electric conduction joint 6211. Also, the insulation layer 63 is formed with at least a through hole 632. Each through hole 632 is at a location both corresponding to the first electric conduction joint 6111 and the second electric conduction joint 6211.

Thus, when pressing at the first electric conduction joint 6111 of the thin film unit 61, the first electric conduction joint 6111 can enter through the through hole 632 to be in electrical contact with the second electric conduction joint 6211. The insulation layer 63 can be made of a light-transmitted material.

In one preferred embodiment according to the present invention, the mentioned light source 64 is a light emitting diode (LED) which has power saving and small volume properties. The light source 64 is installed at a light incident surface formed by lateral sides of both the light guide unit 62 and the insulation layer 63, so lights can be projected into the light guide unit 62 so as to be transferred therein, or can be projected into both the light guide unit 62 and the insulation layer 63 so as to be transferred therein, such that the lights can be output from the light transmitted insulation layer 63 and the thin film unit 61 for achieving a light emitting effect.

Figure 3:
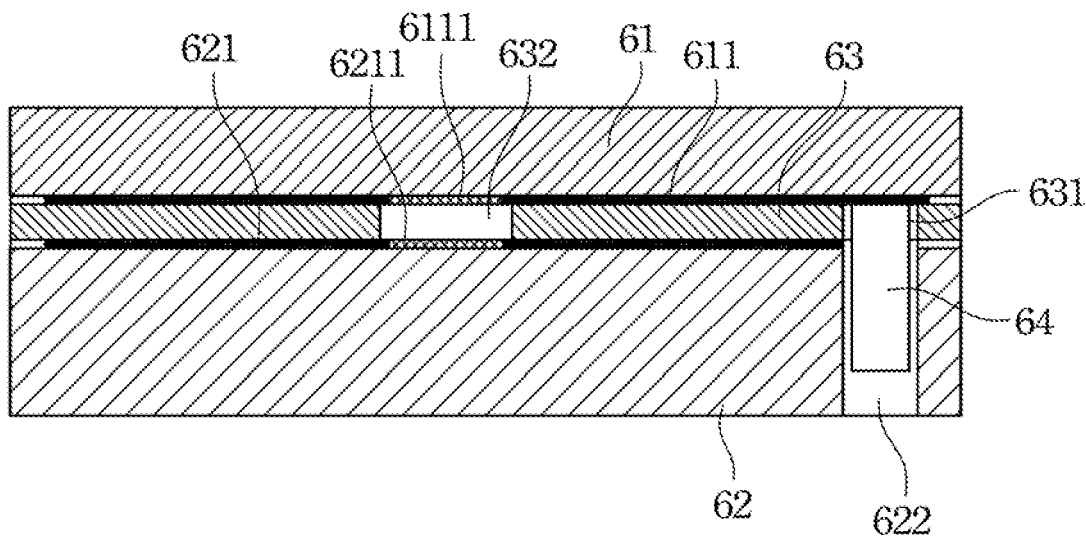
FIG. 3 is a schematic plane view showing the illumination device according to the second embodiment of the present invention.

Referring to FIG. 2, which shows the light source 64 being installed inside the illumination device according to one embodiment of the present invention; the installation method is that: the insulation layer 63 is formed with at least one first hole 631, and the light guide unit 62 is formed with a second hole 622 corresponding to the first hole 631, the light source 64 is directly soldered on the first circuit 611 of the thin film unit 61; after the thin film unit 61, the insulation layer 63 and the light guide unit 62 are stacked together, the light source 64 is accommodated in both the first hole 631 and the second hole 622 to face lateral sides (mutually served as a light incident surface) of the light guide unit 62 and the insulation layer 63, so the lights emitted by the light source 64 can be projected into the light guide unit 62 and the insulation layer 63 from the light incident surface in the first hole 631 and the second hole 622. The mentioned second hole 622 can be a blind hole as shown in FIG. 2, also can be a through hole (as shown in FIG. 3).

Figure 4:
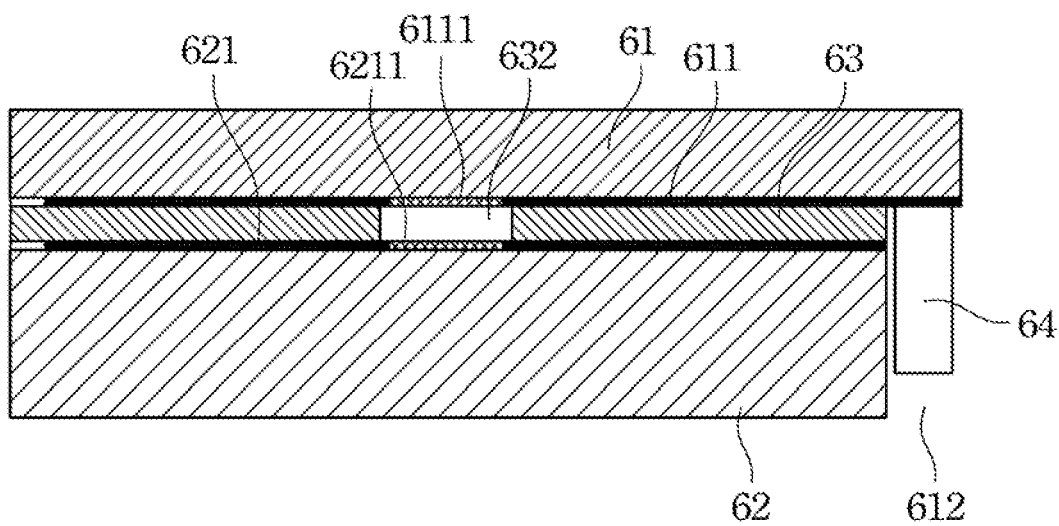
FIG. 4 is a schematic plane view showing the illumination device according to the third embodiment of the present invention.

Referring to FIG. 4, which shows the light source being installed in the illumination device according to another embodiment of the present invention. The lengths of the stacked insulation layer 63 and light guide unit 62 are shorter than that of the thin film unit 61, so a space 612 is naturally formed due to the length differences between the insulation layer 63 and the light guide unit 62 relative to the thin film unit 61; the light source 64 is directly soldered on the first circuit 611 of the thin film unit 61 in the space 612, and arranged to face lateral sides (mutually served as a light incident surface) of both the light guide unit 62 and the insulation layer 63, such that the lights emitted by the light source 64 can be projected into the light guide unit 62 from the light incident surface of the light guide unit 62 in the space 612.

Figure 5:
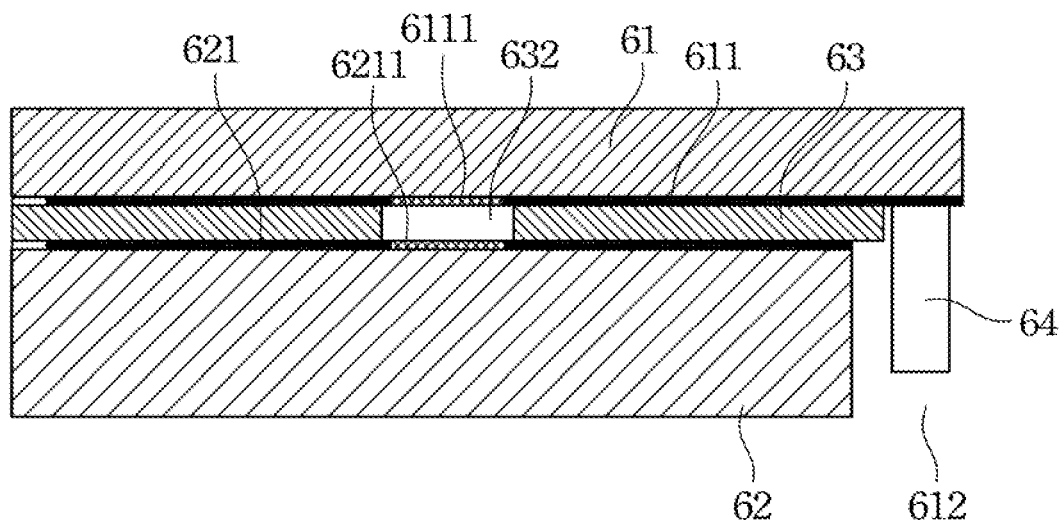
FIG. 5 is a schematic plane view showing the illumination device according to the fourth embodiment of the present invention.

Referring to FIG. 5, which shows the lengths of the insulation layer 63 and the light guide unit 62 are both shorter than that of the thin film unit 61 according to one another embodiment of the present invention; wherein the length of the insulation layer 63 is shorter than that of the thin film unit 61, but the length of the insulation layer 63 is longer than the length of the light guide unit 62, so a space 612 is naturally formed due to the length differences between the insulation layer 63 and the light guide unit 62 relative to the thin film unit 61; the light source 64 is directly soldered on the first circuit 611 of the thin film unit 61 in the space 612, and is spaced with the light guide unit 62, and arranged to face lateral sides (mutually served as a light incident surface) of both the light guide unit 62 and the insulation layer 63, such that the lights emitted by the light source 64 can be projected into the light guide unit 62 from the light incident surface.

Figure 6:
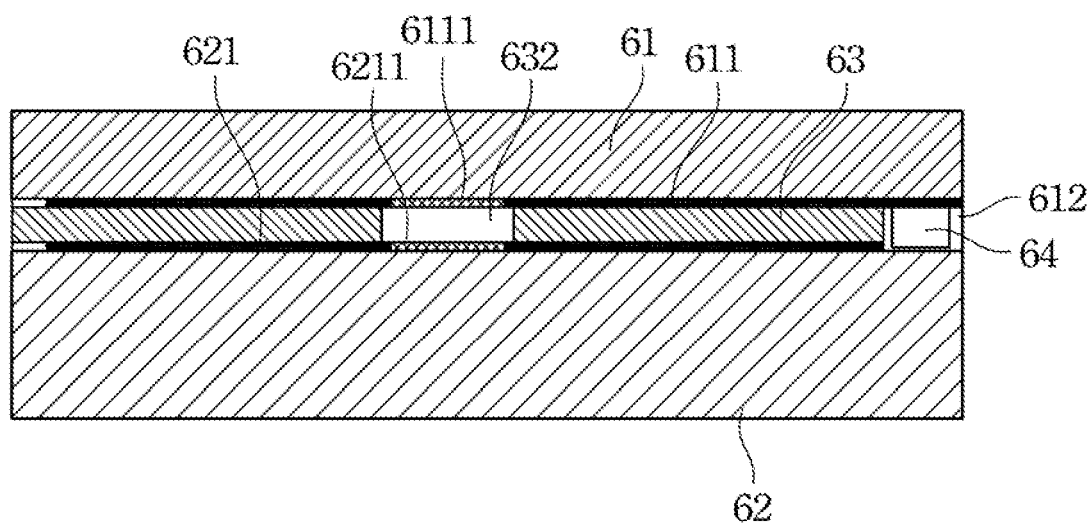
FIG. 6 is a schematic plane view showing the illumination device according to the fifth embodiment of the present invention.

Referring to FIG. 6, which shows the light source being installed in the illumination device according to still one another embodiment of the present invention.

The length of the stacked insulation layer 63 is shorter than that of both of the thin film unit 61 and the light guide unit 62, so a space 612 is naturally formed due to the length difference between the insulation layer 63 relative to the thin film unit 61 and the light guide unit 62; the light source 64 is directly soldered on the first circuit 611 of the thin film unit 61 in the space 612, and arranged to face lateral sides (mutually served as a light incident surface) of both the light guide unit 62 and the insulation layer 63, such that the lights emitted by the light source 64 can be projected into both the light guide unit 62 and the insulation layer 63 from the light incident surface.

Figure 7:
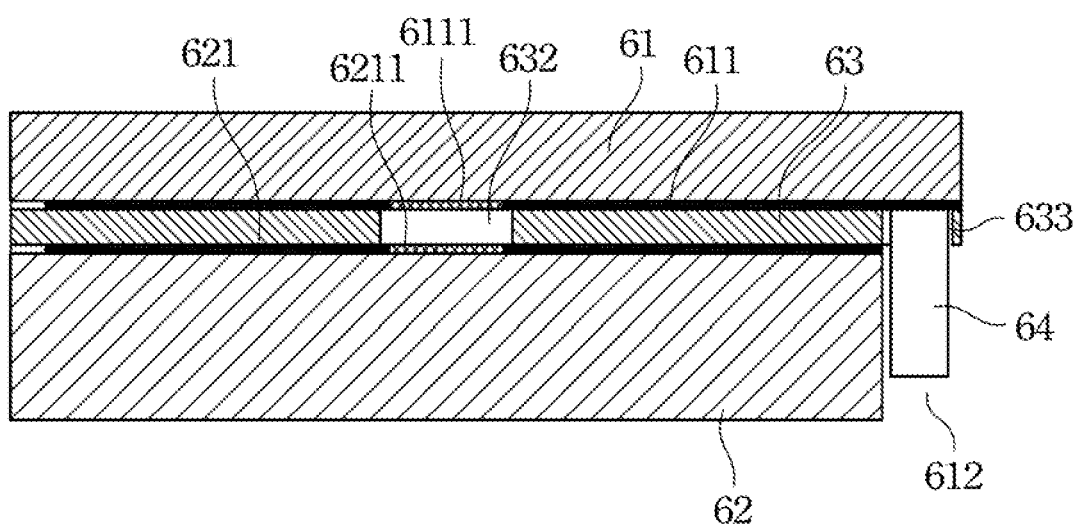
FIG. 7 is a schematic plane view showing the illumination device according to the sixth embodiment of the present invention.

Referring to FIG. 7, which shows the light source being installed in the illumination device according to still one another embodiment of the present invention.

The length of the stacked light guide unit 62 is shorter than that of the thin film unit 61, so a space 612 is naturally formed due to the length difference between the light guide unit 62 relative to the thin film unit 61, and the insulation layer 63 is formed with a penetrating hole 633 communicating to the space 612; the light source 64 is directly soldered on the first circuit 611 of the thin film unit 61, and the light source 64 can penetrate through the penetrating hole 633 to be disposed in the space 612, and arranged to face lateral sides (mutually served as a light incident surface) of both the light guide unit 62 and the insulation layer 63, such that the lights emitted by the light source 64 can be projected into both the light guide unit 62 and the insulation layer 63 from the lateral sides of both the light guide unit 62 and the insulation layer 63.

As above mentioned, the second circuit 621 overlaid on the light output surface of the light guide unit 62 can be exampled as a silver paste circuit, thus, when the light of the light source is input into the light guide unit from the lateral side (as the light incident surface) of the light guide unit, with the light guiding property of the light guide unit, the light of the light source can be output from the mentioned second surface (as the light output surface) of the light guide unit provided with the silver paste circuit thereon, so as to provide a light source to the exterior.

However, the silver paste circuit itself has high absorbing rate and low reflection rate to the input light, so the full reflection angle inside the light guide unit is affected; when the light of the light source in the light guide unit is output towards to the silver paste circuit, the light is absorbed by the silver paste circuit and only a small fraction of light can be reflected back, so the light is not able to be provided to the exterior and the light is also not able to be effectively transferred in the light guide unit; moreover, chromatic is formed on the surface of the light guide unit, and the utilization rate of the light source is therefore lowered.

As such, for increasing the light reflection rate, lowering the possibility of light being absorbed by the silver paste circuit, the present invention further provides a backlight module of illumination device. The feature of the backlight module is to provided a reflection layer formed in a first pattern at the location corresponding to the desired installation location of a silver paste circuit before the silver paste circuit with a second pattern is provided on a light guide unit, thus, before the light hits the silver paste circuit, the light can be reflected back inside the light guide unit, for increasing the light reflection rate and lowering the possibility of light being absorbed by the silver paste circuit, and the problem of unanticipated chromatic is prevented for the light guide unit, thus the utilization rate of light source and the quality of output light are increased.

Figure 8:
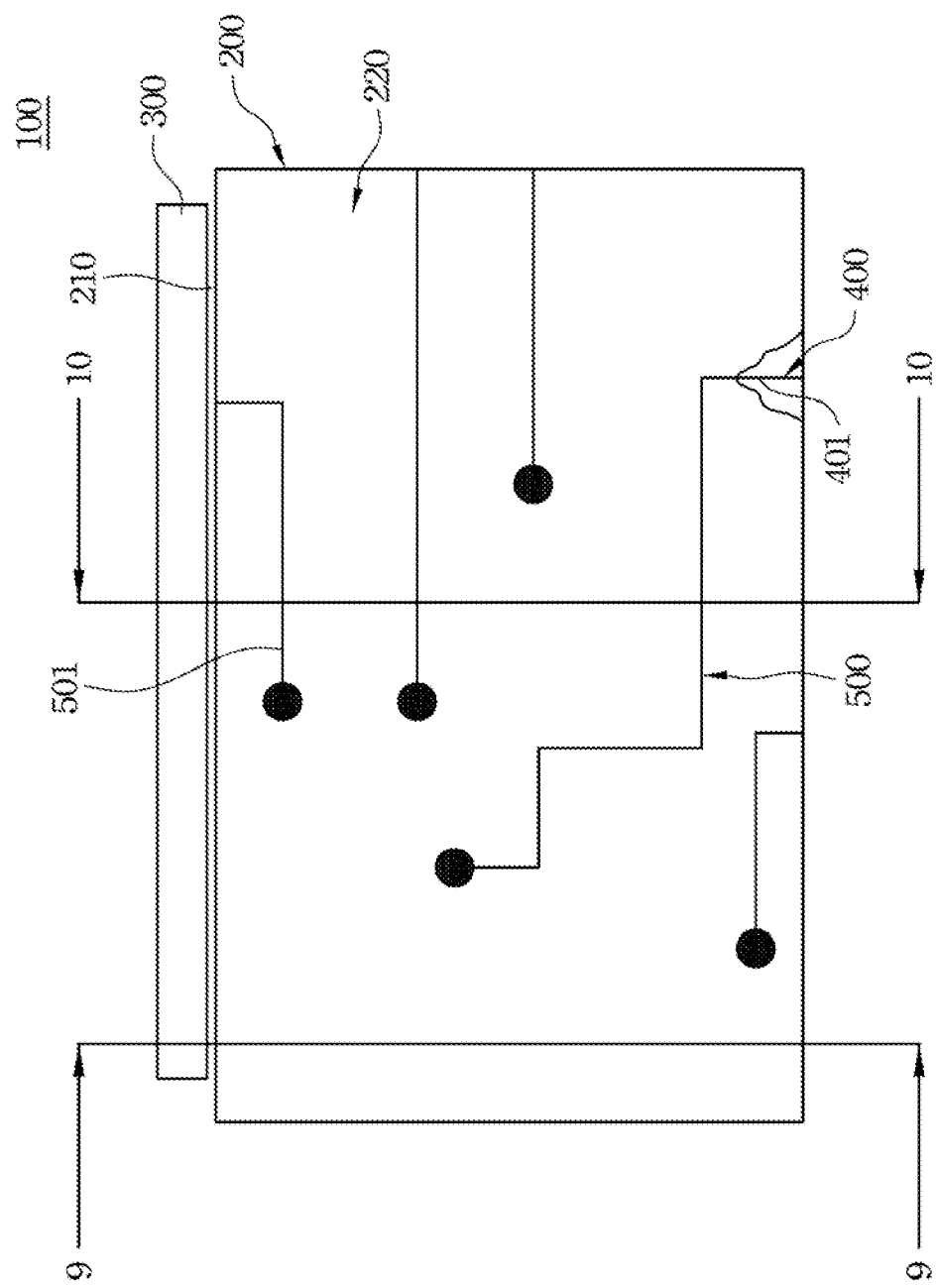
FIG. 8 is a top view showing the backlight module according to one embodiment of the present invention.
Figure 9:
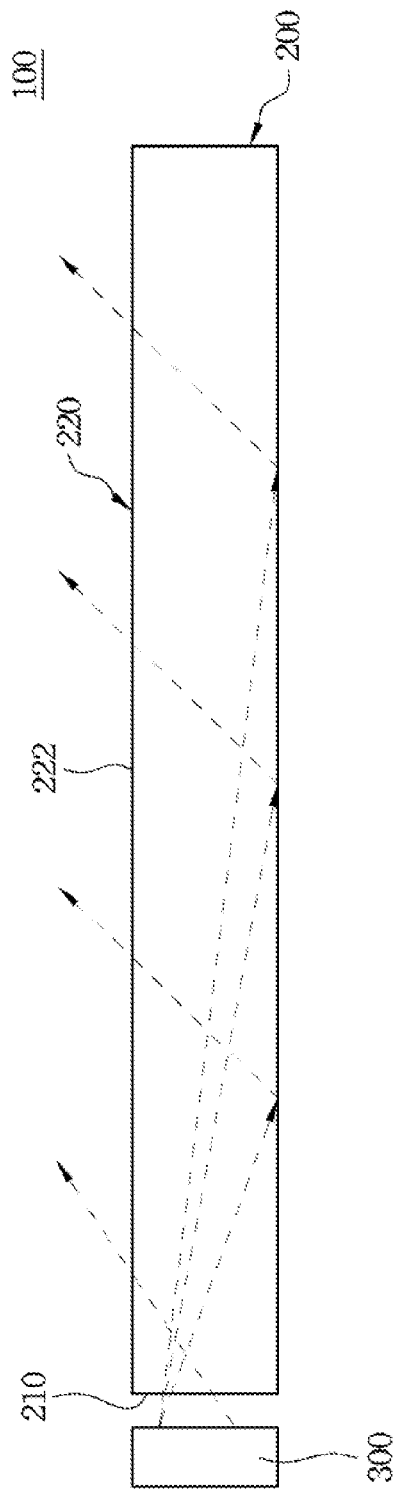
FIG. 9 is a cross sectional view taken along a 9-9 cross line of FIG. 8 and also showing the light path.
Figure 10:
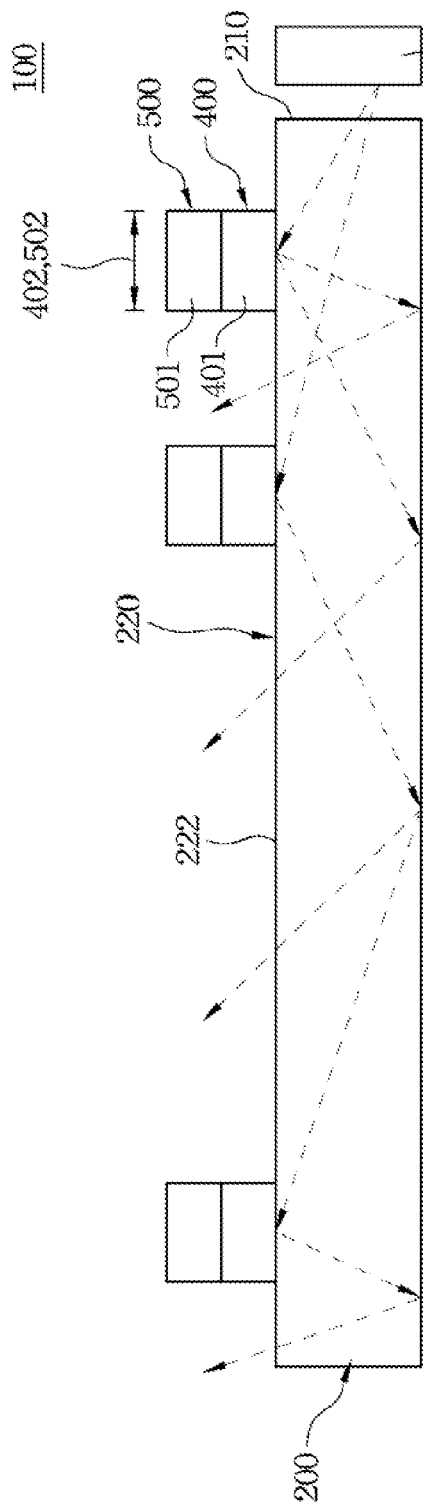
FIG. 10 is a cross sectional view taken along a 10-10 cross line of FIG. 8 and also showing the light path.

Referring from FIG. 8 to FIG. 10, wherein FIG. 8 is a top view showing the backlight module according to one embodiment of the present invention; FIG. 9 is a cross sectional view taken along a 9-9 cross line of FIG. 8 and also showing the light path; and FIG. 10 is a cross sectional view taken along a 10-10 cross line of FIG. 8 and also showing the light moving paths.

The backlight module 100 comprises a light guide unit 200, a light source 300, a reflection layer 400 and a silver paste circuit layer 500. The light guide unit 200 has a light incident surface 210 installed on a lateral side of the light guide unit 200, and a light output surface 220 installed on the above mentioned second surface of the light guide unit 200. The light source 300 is a cold cathode fluorescent lamp (CCFL) or light emitting diode (LED) or alike, and is substantially installed at the light incident surface 210 of the light guide unit 200 for emitting light towards the light incident surface 210. The light source 300 is not limited to connect to the mentioned first circuit only. The reflection layer 400 is formed with a profile of a first pattern to overlay on the light output surface 220. The silver paste circuit layer 500 is formed with a profile of a second pattern on the first pattern of the reflection layer 400, and the second pattern is a circuit distribution diagram. The circuit distribution diagram can respectively and electrically connect to the exterior and perform certain functional operations.

As such, when the lights of the light source 300 are emitted into the light guide unit 200, the lights can be guided to output from an area 222 of the light output surface 220 where the reflection layer 400 and the silver paste circuit layer 500 are not provided; when the lights of the light source 300 in the light guide unit 200 is transferred to the reflection layer 400, the lights can be reflected by the reflection layer 400 and back to inside the light guide unit 200 because the reflection layer 400 is installed between the silver paste circuit layer 500 and the light guide unit 200, then the lights of the light source 300 may be output from the area 222 of the light output surface 220 where the reflection layer 400 and the silver paste circuit layer 500 are not provided.

Accordingly, the lights in the light guide unit 200 which are transferred towards the silver paste circuit layer 500 would not be absorbed by the silver paste circuit layer 500, so more lights can be provided to output outwards the light output surface 220, so the lighting brightness is higher and the utilization rate of the light source 300 is increased.

According to one embodiment of the present invention, as shown from FIG. 8 to FIG. 10, the pattern outline of the second pattern is totally identical to the pattern outline of the first pattern, and the pattern range of the second pattern is equal to the pattern range of the first pattern. For instance, the first pattern is composed of one or plural first lines 401, and the second pattern is composed of one or plural second lines 501. The line widths 502 of the second lines 501 of the second pattern are equal to the line widths 402 of the first lines 401 of the first pattern (as shown in FIG. 10).

Moreover, the first pattern and the second pattern can include geometric patterns such as circulars (not shown).

In other words, the reflection layer 400 is completely disposed between the silver paste circuit layer 500 and the light guide unit 200, which means that through the top view (FIG. 8), the first pattern of the reflection layer 400 is not able to be observed on the light output surface 220 of the light guide unit 200. As such, when the second pattern is completely stacked above the surface of the reflection layer 400, the second pattern completely covers the first pattern, for providing more of the area 222 of the light output surface 220 where the reflection layer 400 and the silver paste circuit layer 500 are not provided, so the lighting brightness will be higher and the utilization rate of the light source 300 will be increased.

Figure 11:
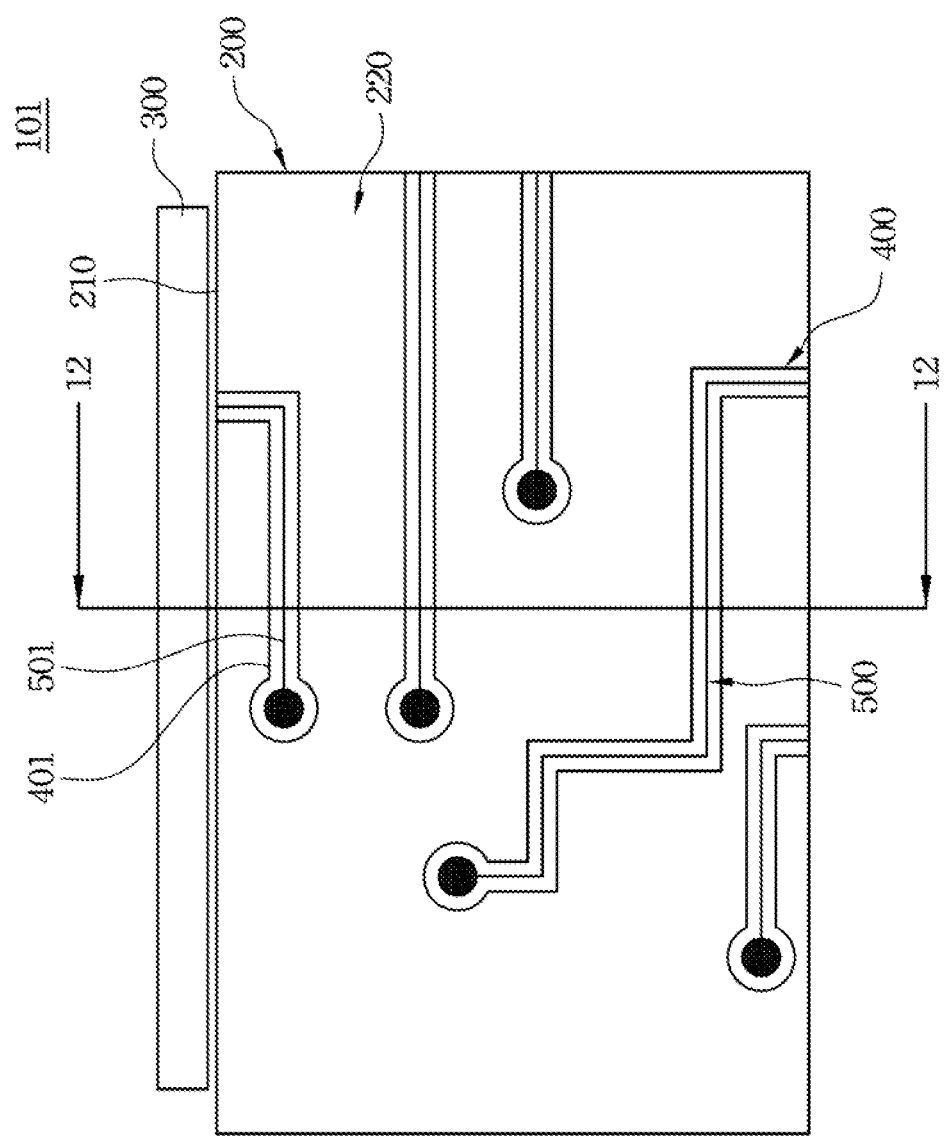
FIG. 11 is a top view showing the backlight module according to another embodiment of the present invention.
Figure 12:
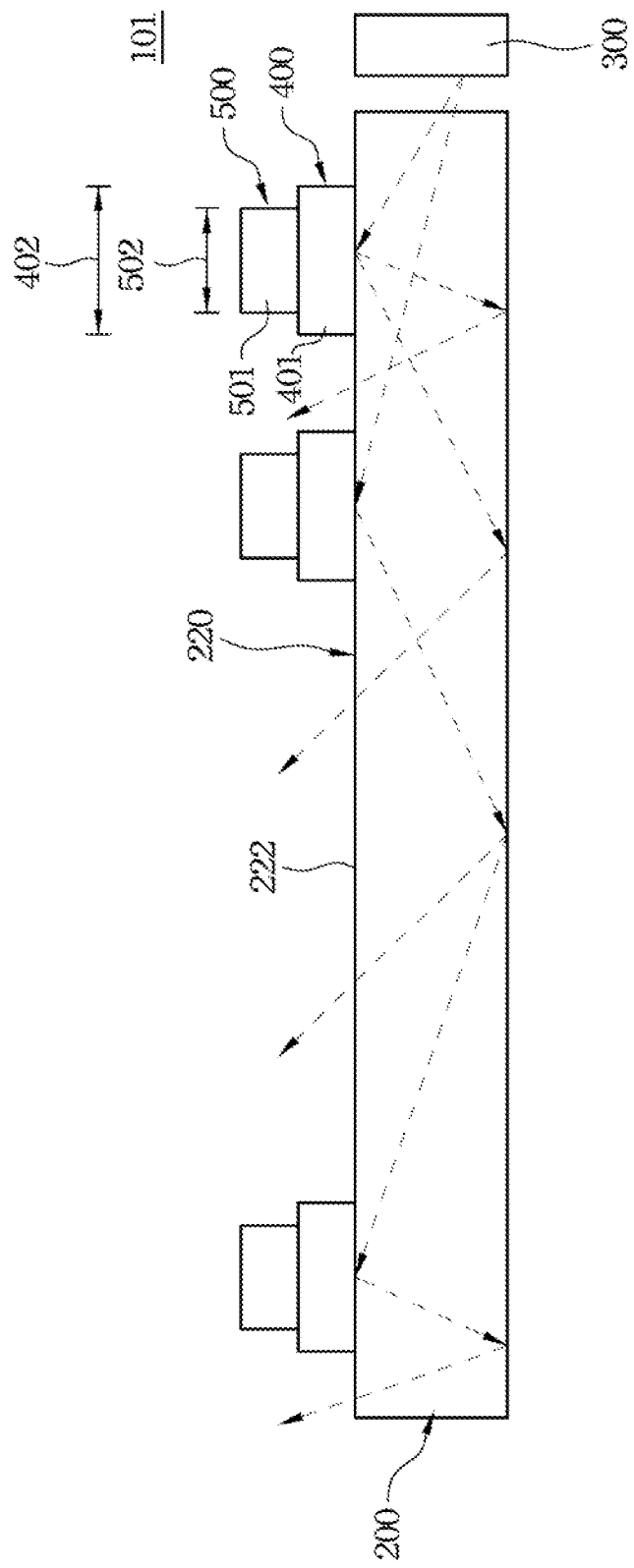
FIG. 12 is a cross sectional view taken along a 12-12 cross line of FIG. 11 and also showing the light path.

Referring to FIG. 11 and FIG. 12, wherein FIG. 11 is a top view showing the backlight module according to another embodiment of the present invention, and the FIG. 12 is a cross sectional view taken along a 12-12 cross line of FIG. 11 and also showing the light moving paths.

In the backlight module 101 according to the embodiment of the present invention, the pattern outline of the second pattern is substantially the same as that of the first pattern, but the pattern range of the second pattern is smaller than that of the first pattern. Take the prior example for illustration, the first pattern is composed of one or plural of the first lines 401, and the second pattern is composed of one or plural of the second lines 501. The line widths 502 of the second lines 501 of the second pattern are smaller than the line widths 402 of the first lines 401 of the first pattern (as shown in FIG. 12). Or the first pattern and the second pattern can include geometric patterns such as circulars (not shown).

In other words, when the second pattern is stacked on the surface of the reflection layer 400, the second pattern is not able to totally cover the first pattern. As such, because the pattern range of the second pattern of the silver paste circuit layer 500 is smaller than that of the first pattern of the reflection layer 400, the second pattern can provide more possibility for reflection, so the possibility of light being output from the area 222 of the light output surface 220 where the reflection layer 400 and the silver paste circuit layer 500 are not provided is increased.

Figure 13:
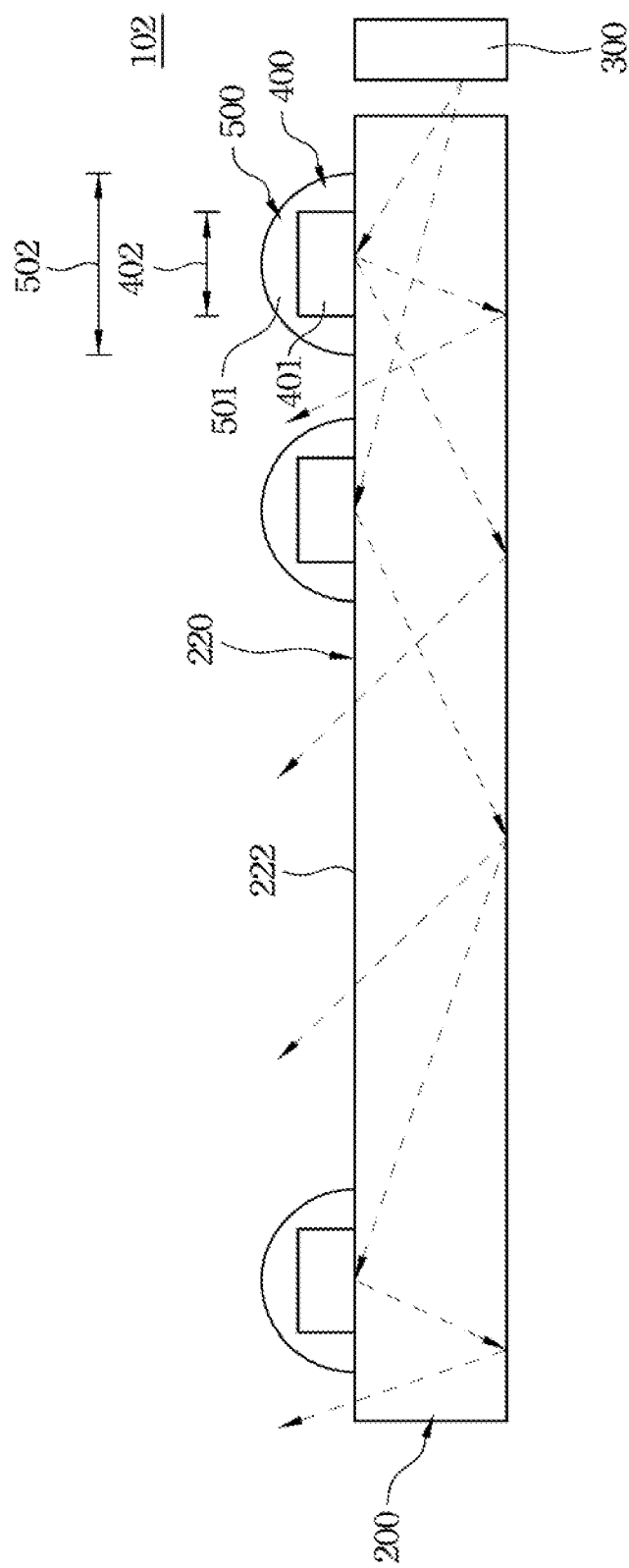
FIG. 13 is a cross sectional view showing the backlight module and also showing the light path, according to still one another embodiment of the present invention.

Referring to FIG. 13, FIG. 13 is a cross sectional view showing the backlight module and also showing the light path.

According to still one another embodiment of the present invention. According to the backlight module 102 of the still one another embodiment of the present invention, the pattern outline of the second pattern is substantially the same as that of the first pattern, but the pattern range of the second pattern in larger than that of the first pattern. Take the prior example for illustration, the first pattern is composed of one or plural of the first lines 401, and the second pattern is composed of one or plural of the second lines 501. The line widths 502 of the second lines 501 of the second pattern are larger than the line widths 402 of the first lines 401 of the first pattern, so the second lines 501 of the second pattern covers the first lines 401 of the first pattern and the light output surface 220. Or the first pattern and the second pattern can include geometric patterns such as circulars (not shown).

In other words, the silver paste circuit layer 500 synchronously covers the reflection layer 400 and the light output surface 220. The reflection layer 400 is still disposed between the silver paste circuit layer 500 and the light output surface 220, the reflection layer 400 still can guide lights to the area 222 of the light output surface 220 where the reflection layer 400 and the silver paste circuit layer 500 are not provided.

According to other embodiments of the present invention, the light guide unit 200 is a rectangular plate with even thickness or a wedge plate having thickness from thick to thin, and has a front surface and an opposite rear surface, and four lateral sides surrounding the front surface and the rear surface, the areas of the front surface or the rear surface are both larger than the area of any lateral side. Any lateral side of the light guide unit 200 can be served as the light incident surface 210 for guiding the light into the light guide unit 200. The front surface of the light guide unit 200 is defined as the light output surface 220 for outputting the light to the exterior.

In this embodiment, the material of which the light guide unit 200 is made of is a transparent plastic material, e.g.

polyethylene terephthalate (PET) or polycarbonate (PC). A research and develop personnel can choose the suitable material for the light guide unit 200 according to the actual needs or limitations.

According to still one another embodiment of the present invention, the light guide unit 200 can also be a flexible circuit board. The board is equipped with a plurality of optical microstructures (not shown) which can be respectively arranged on the light incident surface 210 or another surface of the board opposite to the light output surface 220, or synchronously arranged on the light incident surface 210 and the other surface of the board opposite to the light output surface 220. According to the present invention, the format of the optical microstructures are not limited, which can be in convex shape, concave shape, sphere shape or saw shape, for generating more refractions for the light emitted by the light source 300 so as to be transferred in the light guide unit 200 more homogeneously. The research and develop personnel can make adjustments according to the actual needs or limitations.

According to still one another embodiment of the present invention, the reflection layer 400 is coated or printed on the front surface of the light guide unit 200 through a glue material containing resin for mating with the second pattern of the silver paste circuit layer 500. Moreover, the reflection layer 400 can preferably be opaque and in white or silver color which has better reflection property. The research and develop personnel can adjust the color of the reflection layer 400 according to the actual needs or limitations.

Moreover, the reflection layer 400 can also be made of a transparent glue material (e.g. UV glue), wherein the reflection layer is transparent (or at least translucent), as long as the (light) refraction rate is smaller than that of the light guide unit.

Figure 14:
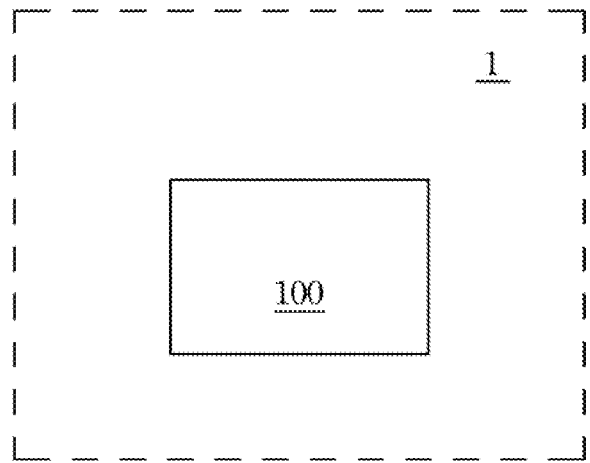
FIG. 14 is a diagram showing the electronic device according to still one another embodiment of the present invention.

Referring to FIG. 14, which is a diagram showing the electronic device according to still one another embodiment of the present invention.

In this still one another embodiment according to the present invention, one of the mentioned backlight modules 100, 101, 102 can be adopted in an electronic device 1. According to the present invention, the electronic device 1 is not limited to a mouse, keyboard, cell phone, video camera, photo camera, game device, watch, music displayer, email receiver, map navigator or digital photo frame.

Figure 15:
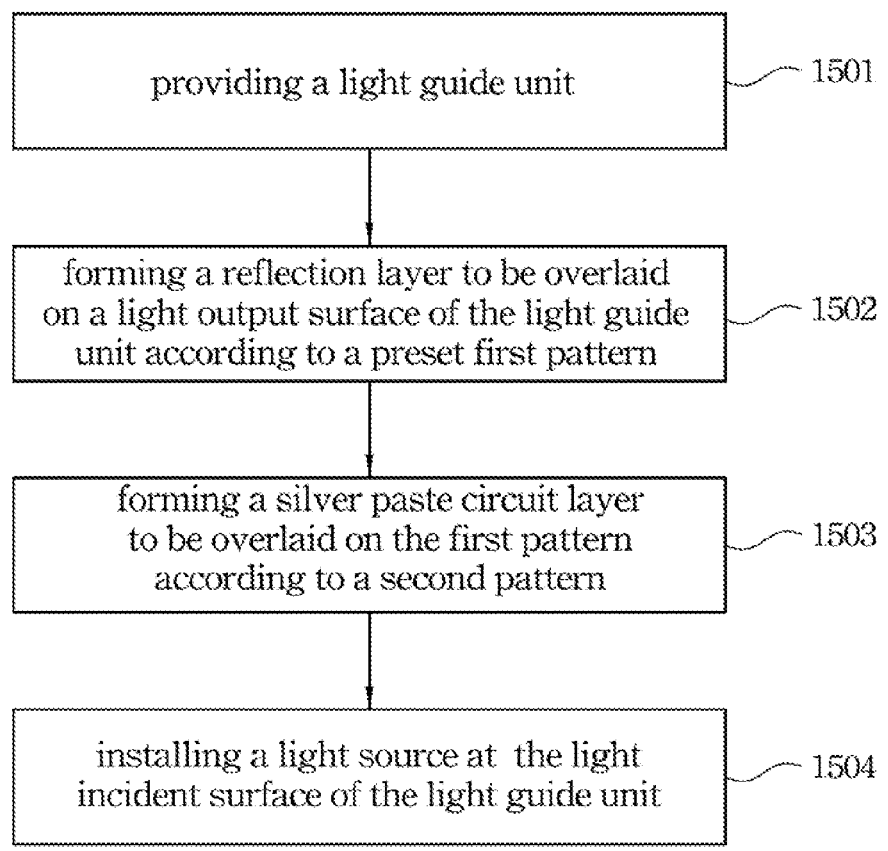
FIG. 15 is a flow block chart showing the manufacturing method of the backlight module according to the present invention.

Referring to FIG. 15, which is a flow block chart showing the manufacturing method of the backlight module according to the present invention.

One alternative of the present invention is to provide a manufacturing method of the backlight module (such as one of the mentioned backlight modules 100, 101, 102), for increasing the utilization rate of the light source 300 and the quality of output light, which at least comprises the steps:

Step 1501: providing an abovementioned light guide unit 200, which can be a light guide unit 200 made of an acrylic material or a flexible printed circuit board.

Step 1502: forming a reflection layer 400 being overlaid on a light output surface 220 of the light guide unit 200 according to a preset first pattern; wherein the reflection layer 400 can be formed with the pattern outline same as the mentioned second pattern (e.g. circuit distribution diagram) on the light output surface 220 with a means of printing, transferring, coating or adhering.

Step 1503: forming a silver paste circuit layer 500 having the mentioned second pattern being overlaid on the first pattern of the reflection layer 400; in this step, the research and develop personnel can choose whether the pattern range of the second pattern of the silver paste circuit layer 500 being smaller (as shown in FIG. 12), larger (as shown in FIG. 13) or equal (FIG. 10) to the pattern range of the first pattern of the reflection layer 400; wherein the silver paste circuit layer 500 can be formed on the reflection layer 400 through a means of evaporation, electroplating, printing or solder transferring.

Step 1504: installing a light source 300, e.g. a cold cathode fluorescent lamp (CCFL) or light emitting diode (LED), at the light incident surface 210 of the light guide unit 200, for emitting lights towards the light incident surface 210 of the light guide unit 200.

As abovementioned, with the reflection layer 400 installed between the silver paste circuit layer 500 and the light guide unit 200, the present invention not only overcomes the problem of light being absorbed by the silver paste circuit, but also increases the brightness of the light output from the light output surface 220, so the utilization rate of the light source 300 is increased.

Moreover, the mentioned illumination device can be adopted in a keyboard of notebook computer, cell phone, various types of panels, clock, watch or digital photo frame for serving as a backlight source.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A backlight module, comprising:
    an electrically conductive element installed with a first circuit;
    a light guide unit installed with a second circuit;
    an insulation layer installed between the first circuit and the second circuit, the insulation layer being formed with at least one through hole and a first hole, the through hole and the first hole being spatially separated from each other and exposing different portions of the first circuit, the through hole exposing a portion of the second circuit; and
    at least a light source disposed in the first hole and electrically connected to the first circuit, and arranged to project lights into the light guide unit.

2. The backlight module according to claim 1, wherein the light guide unit is formed with a second hole corresponding to the first hole each other, and the light source is further disposed in the second hole.

3. The backlight module according to claim 2, wherein the second hole is one of a through hole and a blind hole.

4. The backlight module according to claim 1, wherein a length of the insulation layer is shorter than a length of the electrically conductive element, the light source is disposed in a space formed through the length difference of the insulation layer and the electrically conductive element.

5. The backlight module according to claim 1, wherein a length of the light guide unit is shorter than a length of the electrically conductive element, the light source is disposed in a space formed through the length difference of the light guide unit and the electrically conductive element.

6. The backlight module according to claim 1, wherein a length of the insulation layer and a length of the light guide unit are both shorter than a length of the electrically conductive element, the light source is disposed in a space formed through the length difference of the insulation layer and the electrically conductive element, and through the length difference of the light guide unit and the electrically conductive element.

7. The backlight module according to claim 1, wherein the electrically conductive element is a flexible electrically conductive element.

8. The backlight module according to claim 1, wherein the light guide unit is a flexible light guide unit.

9. A backlight module, comprising:
an electrically conductive element installed with a first circuit;
a light guide unit having a light incident surface and a light output surface;
a reflection layer shaped in a first pattern and installed on the light output surface;
a second circuit shaped in a second pattern and installed on the first pattern;
an insulation layer installed between the first circuit and the second circuit, the insulation layer being formed with at least one through hole and a first hole, the through hole and the first hole being spatially separated from each other and exposing different portions of the first circuit, the through hole exposing a portion of the second circuit; and
a light source disposed in the first hole and electrically connected to the first circuit, installed at the light incident surface and arranged to project lights into the light guide unit.

10. The backlight module according to claim 9, wherein the light guide unit is formed with a second hole corresponding to the first hole, and the light source is further disposed in the second hole.

11. The backlight module according to claim 9, wherein a range of the second pattern of the second circuit is smaller, larger or equal to a range of the first pattern of the reflection layer.

12. The backlight module according to claim 9, wherein a refractive index of the reflection layer is smaller than a refractive index of the light guide unit.

13. The backlight module according to claim 9, wherein the light guide unit is a flexible printed circuit board.

14. A backlight module, comprising:
an electrically conductive element installed with a first circuit;
a light guide unit having a light incident surface and a light output surface;
a reflection layer shaped in a first pattern and installed on the light output surface;
a silver paste circuit layer shaped in a second pattern and installed on the first pattern;
an insulation layer installed between the first circuit and the silver paste circuit layer, the insulation layer being formed with at least one through hole and a first hole, the through hole and the first hole being spatially separated from each other and exposing different portions of the first circuit, the through hole exposing a portion of the silver paste circuit layer; and
a light source disposed in the first hole and electrically connected to the first circuit, installed at the light incident surface and arranged to project lights into the light guide unit.

15. The backlight module according to claim 14, wherein the area of the silver paste circuit layer is smaller, larger or equal to the area of the first pattern of the reflection layer.

16. The backlight module according to claim 14, wherein the reflection layer includes resin material.

17. The backlight module according to claim 14, wherein the reflection layer is with white or silver color.

18. The backlight module according to claim 14, wherein a refractive index of the reflection layer is smaller than a refractive index of the light guide unit.

19. The backlight module according to claim 14, wherein the light guide unit is a flexible printed circuit board.

20. The backlight module according to claim 19, wherein the flexible printed circuit board has a plurality of optical microstructures arranged on the light incident surface or another surface of the flexible printed circuit board opposite to the light output surface.

* * * * *